(12) United States Patent
Meixner et al.

(10) Patent No.: US 8,006,777 B2
(45) Date of Patent: Aug. 30, 2011

(54) HAND-HELD POWER TOOL

(75) Inventors: Ralf Meixner, Germaringen (DE);
Guenther Veik, Maeder (AT);
Hans-Joerg Rieger, Thueringen (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 12/231,305

(22) Filed: Aug. 28, 2008

(65) Prior Publication Data

US 2009/0071670 A1    Mar. 19, 2009

(30) Foreign Application Priority Data

Sep. 12, 2007  (DE) .................. 10 2007 000 489

(51) Int. Cl.
*B25F 5/00* (2006.01)
*B26B 25/00* (2006.01)
(52) U.S. Cl. ........ 173/31; 173/213; 173/171; 125/13.01
(58) Field of Classification Search .......... None
See application file for complete search history.

(56) References Cited

U.S. PATENT DOCUMENTS

| | | | | |
|---|---|---|---|---|
| 1,563,844 A * | 12/1925 | Gerlach | ............... | 30/371 |
| 1,601,859 A * | 10/1926 | Johnson | ............... | 30/379 |
| 2,126,336 A * | 8/1938 | Mall | ............... | 105/162 |
| 2,691,392 A * | 10/1954 | Jacobs et al. | ............... | 30/379 |
| 2,828,051 A * | 3/1958 | De Puydt et al. | ............... | 222/41 |
| 2,934,327 A * | 4/1960 | Lewis | ............... | 299/39.3 |
| 2,937,772 A * | 5/1960 | Sullivan | ............... | 414/563 |
| 3,092,156 A * | 6/1963 | Hayden | ............... | 30/371 |
| 3,656,468 A * | 4/1972 | Welden | ............... | 125/13.01 |
| 3,896,783 A * | 7/1975 | Manning | ............... | 125/13.01 |
| 4,188,935 A * | 2/1980 | Tubesing | ............... | 125/13.01 |
| 4,250,968 A * | 2/1981 | Fox | ............... | 172/60 |
| 4,310,198 A * | 1/1982 | Destree | ............... | 299/39.3 |
| 4,610,558 A * | 9/1986 | Erickson | ............... | 403/1 |
| 5,033,564 A * | 7/1991 | Mattson | ............... | 180/11 |
| 5,452,943 A * | 9/1995 | Campbell | ............... | 299/39.3 |
| 5,482,026 A * | 1/1996 | Russell | ............... | 125/12 |
| 5,540,210 A * | 7/1996 | Jones | ............... | 125/13.01 |
| 5,788,561 A * | 8/1998 | Pearlman et al. | ............... | 451/353 |
| 5,803,071 A * | 9/1998 | Chiuminatta et al. | ............... | 125/13.01 |
| 5,810,448 A * | 9/1998 | Kingsley et al. | ............... | 299/39.3 |
| 6,290,161 B1 * | 9/2001 | Chang | ............... | 242/396.9 |
| 6,318,483 B1 * | 11/2001 | Garrett et al. | ............... | 180/9.21 |
| 6,349,712 B1 * | 2/2002 | Halstead | ............... | 125/12 |
| 6,516,575 B2 * | 2/2003 | Haab et al. | ............... | 52/243.1 |
| 6,568,088 B1 * | 5/2003 | Ende | ............... | 30/371 |
| 6,623,342 B1 * | 9/2003 | McDonald | ............... | 451/360 |
| 6,637,424 B1 * | 10/2003 | Fuhrman et al. | ............... | 125/35 |
| 7,144,311 B2 * | 12/2006 | Jaensch | ............... | 451/358 |
| 7,222,618 B2 * | 5/2007 | Galambos et al. | ............... | 125/13.01 |
| 7,770,574 B1 * | 8/2010 | Ferreira | ............... | 125/13.01 |
| 7,866,409 B2 * | 1/2011 | Vaughn et al. | ............... | 172/42 |
| 2002/0178668 A1* | 12/2002 | Haab et al. | ............... | 52/243.1 |

(Continued)

FOREIGN PATENT DOCUMENTS

GB    2062730    5/1981

*Primary Examiner* — Lindsay Low
(74) *Attorney, Agent, or Firm* — Abelman, Frayne & Schwab

(57) ABSTRACT

A hand-held power tool for driving a cutting or grinding working tool (11) includes a running gear (13) having a roller (15) and a support section (14) for supporting the roller (15), and a locking device (20) for locking the roller (15) against rotation relative to the support section (14).

4 Claims, 4 Drawing Sheets

U.S. PATENT DOCUMENTS

| | | | |
|---|---|---|---|
| 2003/0166386 A1* | 9/2003 | McDonald | 451/360 |
| 2004/0173198 A1* | 9/2004 | Glenn | 125/13.01 |
| 2004/0183274 A1* | 9/2004 | Schipper | 280/641 |
| 2005/0178376 A1* | 8/2005 | Meister et al. | 125/13.01 |
| 2006/0060179 A1* | 3/2006 | Kingsley et al. | 125/13.01 |
| 2006/0102212 A1* | 5/2006 | Leasure et al. | 134/172 |
| 2007/0145700 A1* | 6/2007 | Ambrose et al. | 280/47.26 |

\* cited by examiner

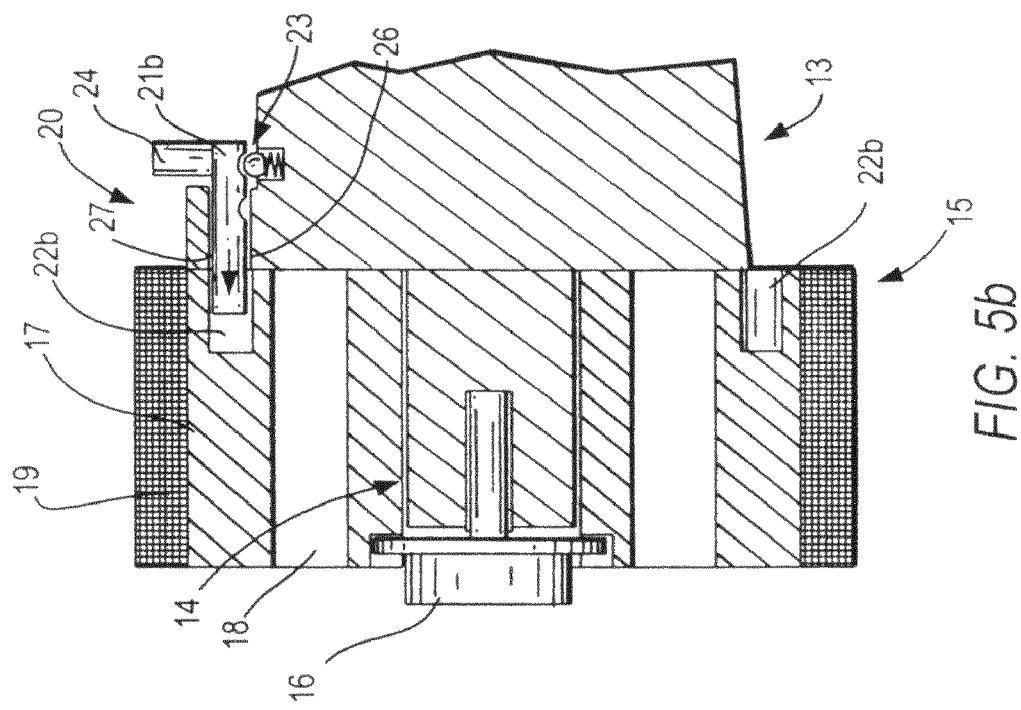
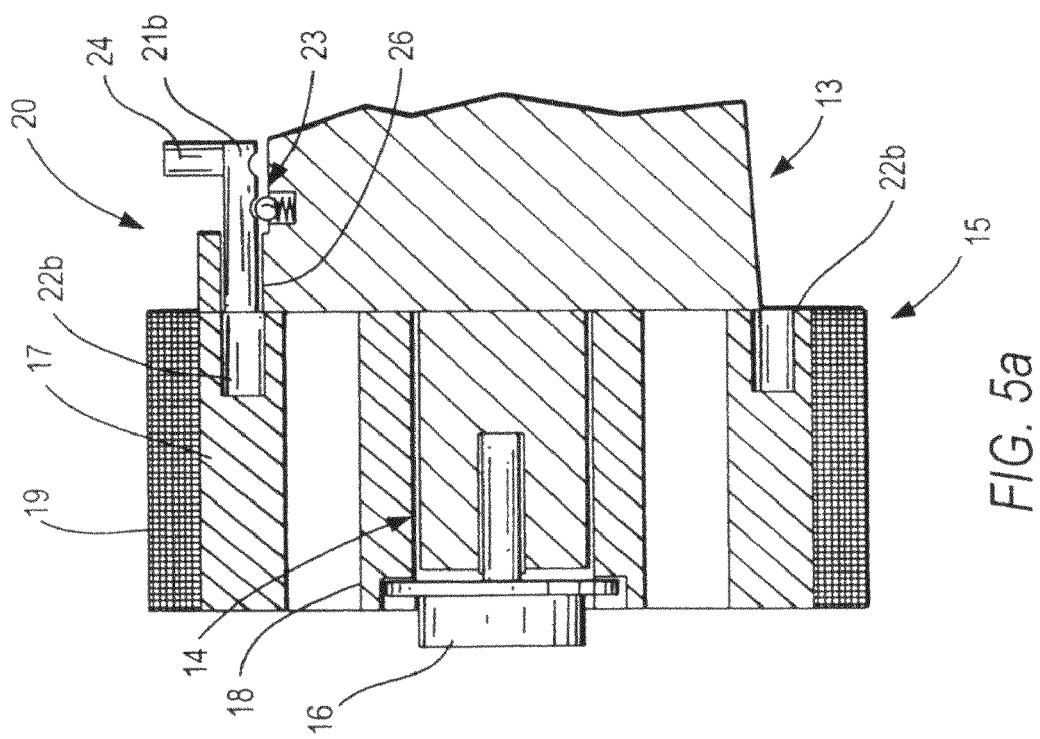

HAND-HELD POWER TOOL

BACKGROUND OF THE INVENTION

1. Field of the Invention

The present invention relates to a hand-held power tool such as grinding power tool, cutting power tool, or abrasive cutting-off power tool, for driving a cutting or grinding working tool.

2. Description of the Prior Art

Hand-held power tools of the type described above include disc-shaped cutting tools which rotate during an operation, e.g., for forming cuts in constructional elements, e.g., in a road-surfacing. In order to insure guidance of a power tool during its displacement, the running gear of the power tool includes rollers which, in addition, carry a portion of a load of such a power tool. In certain applications, it may be necessary that the power tool is stably supported at a localized spot, i.e., without the possibility of displacement in the cut displacement direction. For such applications, the rollers need be dismounted and replaced with alternatively mountable support feet.

German Utility Model DE 20 2004 007 699 U discloses a hand-held power tool which is formed as an abrasive cutting-off tool and has a running gear with two rotatable rollers mounted thereon. The running gear also has support points about which the power tool can be tilted. In the rest position, the power tool is supported at the support points, while during an operation, it is guided on the rollers when the power tool is lifted by a user at its end remote from the cutting working tool.

The drawback of the abrasive cutting tool described above consists that there is no support points at which the power tool can be stably supported at a localized spot during an operation of the power tool.

An object of the present invention is to provide a hand-held power tool in which the above-discussed drawback of the known power tool is eliminated, and in simple manner, and a stable support at a localized spot is possible even in the operational position of the power tool.

SUMMARY OF THE INVENTION

This and other objects of the present invention, which will become apparent hereinafter, are achieved by providing a hand-held power tool which includes, according to the present invention, a locking device for locking the at least one locking roller against rotation relative to the roller support section of the running gear. The locking device permits to dispense with, otherwise, alternatively mountable support feet. There is no need for the user to carry additional components. The stable support at a localized spot can be effected directly by securing a roller or rollers against rotation.

According to a constructively advantageous embodiment of the present invention, the locking device includes at least one locking element provided on the support section and at least one counter-locking element provided on the roller and engageable with the at one locking element in a locking position of the locking device for securing the roller on the support section against rotation relative thereto. This insures a fixing position of the roller on the support section, without a possibility of rotation of the roller relative thereto.

Advantageously, the locking element is formed as a projection provided on the support section and the counter-locking element is formed as an opening provided in the roller for formlockingly receiving the projection.

According to an alternative embodiment of the invention, the locking element is formed as an elongate locking pin displaceable along its longitudinal extent, and the counter-locking element is formed as a pin receptacle for formlockingly receiving the pin in the locking position of the locking device. With the locking element being formed as a locking pin, there is no need anymore to dismount the roller and to rotate it in order to fixedly mounted it on the support element. For blocking the rotation of the roller relative to the support section, it is sufficient to simply displace the locking pin into the corresponding counter-locking element, the pin receptacle.

It is advantageous, when there are provided at least two support sections both provided with at least one locking element respectively, and at least two rollers mounted on respective support sections and each having a counter-locking element engageable with a respective one of the locking elements. Thereby, a symmetrical two-point support is provided and which reliably prevents tilting of the cutting working tool during an operation.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 3*a* a cross-sectional view of the running gear with a roller supported thereon in a locking position of the locking device of the hand-held power tool shown in FIG. 1;

FIG. 5*a* a longitudinal cross-sectional view of a detail of the running gear of another embodiment of a hand-held power tool according to the present invention with a supported thereon roller in a release position of the locking device of the another hand-held power tool; and FIG. 5*b* a view similar to that shown in FIG. 5*a* but in the locking position of the locking device.

DETAILED DESCRIPTION OF THE PREFERRED EMBODIMENTS

Figure 1:
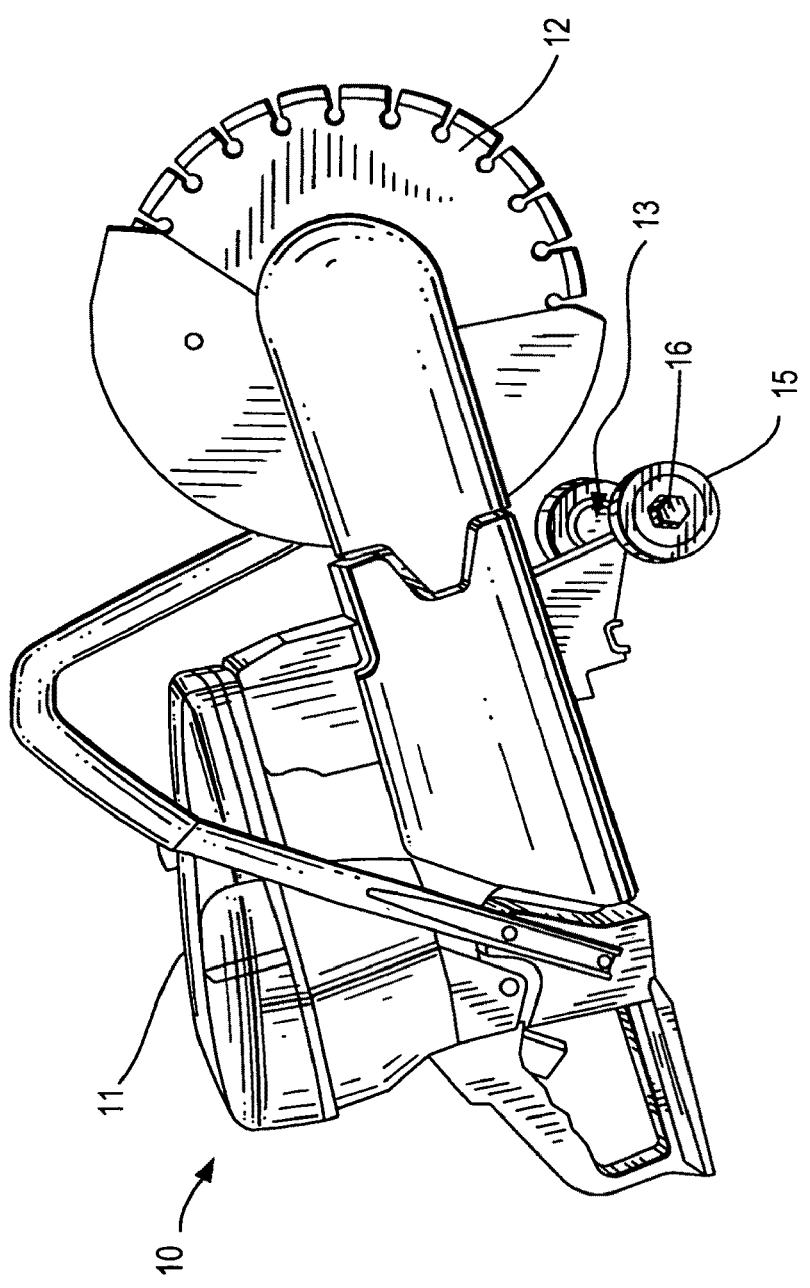
FIG. 1 a side view of a hand-held power tool according to the present invention.
Figure 3A:
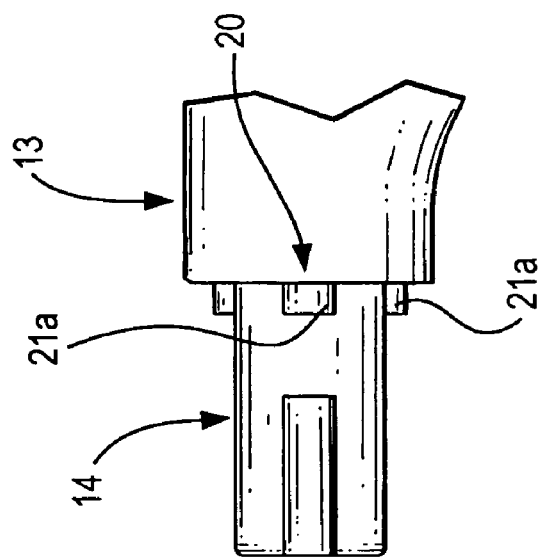
FIG. 3*a* a side view of a detail of a running gear of the hand-held power tool shown in FIG. 1.
Figure 2:
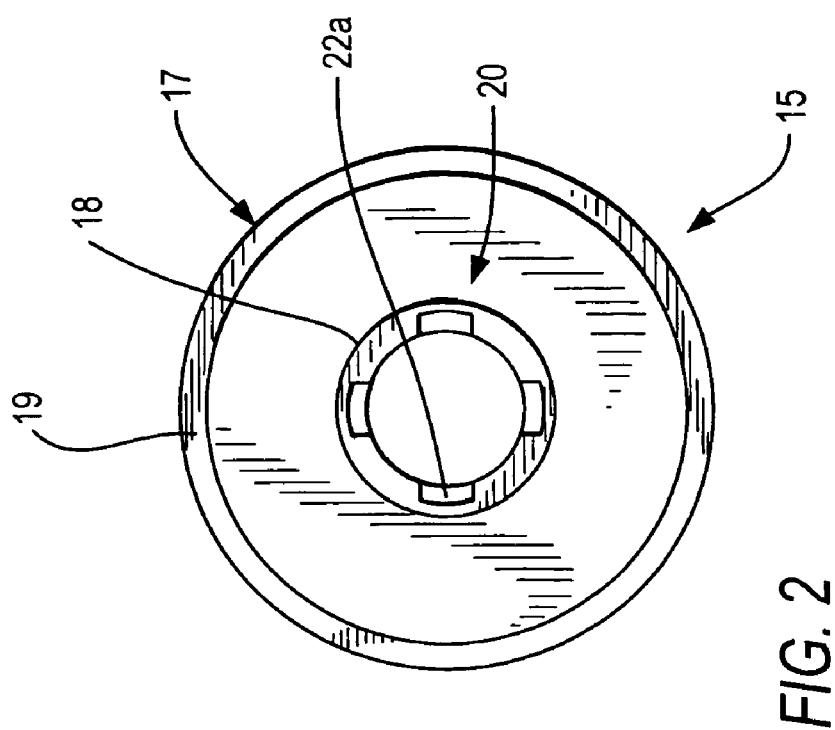
FIG. 2 a first side view of a roller of the hand-held power tool shown in FIG. 1.
Figure 4:
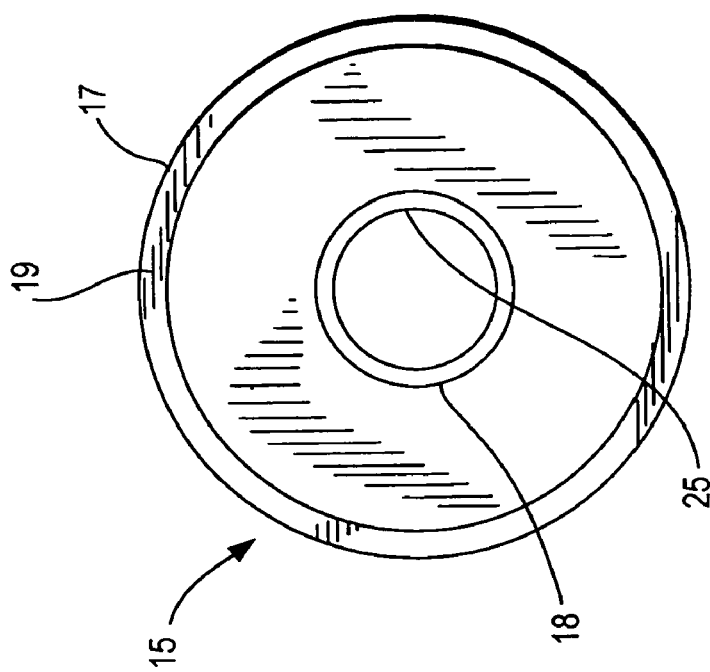
FIG. 4 a second side view of the roller of the hand-held power tool shown in FIG. 1.
Figure 3B:
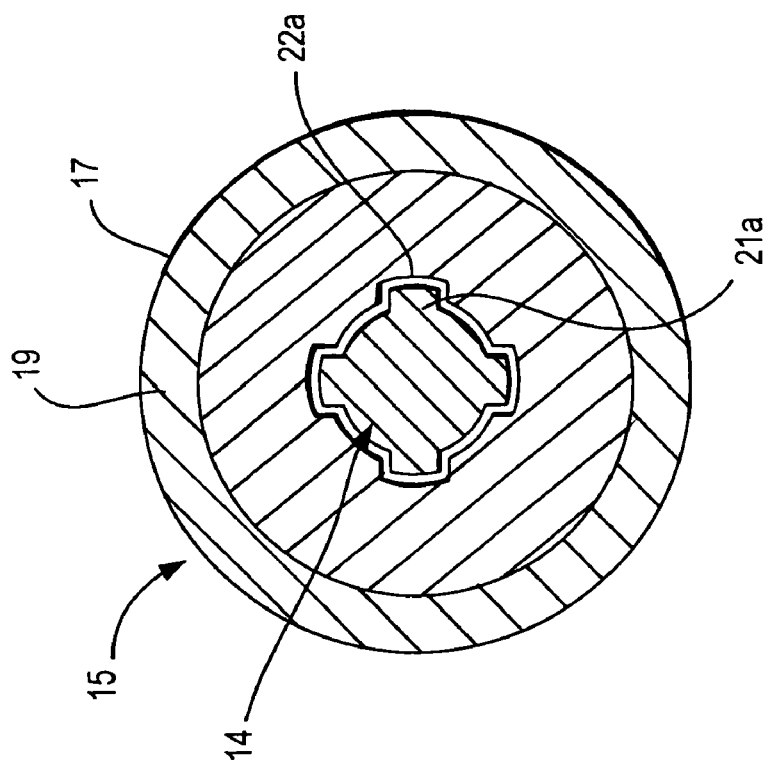

A hand-held power tool 10 according to the present invention, which is formed as an abrasive cutting-off power tool and a first embodiment of which is shown in FIGS. 1-4, includes a disc-shaped cutting working tool 12 for cutting-off objects, and a drive unit for driving the cutting working tool 12 and located in a power tool housing 11. The hand-held power tool 10 further has a running gear 13 with two rollers 15. The running gear 13 has two support sections 14 each of which supports a respective roller 15 that is secured by screw means 16 (see FIGS. 2, 3*a* and 3*b*). The rollers 15 serve for displacement of the power tool 10 and carry a portion of the weight of the power tool 10. The rotational axes of the rollers 15 preferably extend parallel to the rotational axis of the cutting working tool 12.

The rollers 15 have each a running wheel 17 with a located radially inwardly, hub 18 and a tire 19 arranged on the running wheel 17 radially outwardly. The hub 18 serves for receiving a cylindrical portion of a support section 14 of the running gear 13.

The hand-held power tool 10 further has a locking device 20 for the roller 15 and which includes at least one locking element 21a provided on the respective support section 14 and a counter-locking element 22a provided on the roller 15. With the locking device 20, the roller 15 can be secured against rotation. To this end, the roller 15 is so mounted on the locking section 14 that has four locking elements 21a which are formed as projections provided on the support section 14 (see FIGS. 3a and 3b) and engage in counter-elements 22a which are formed as openings on an axial end of the hub 18 (see FIG. 3b). After tightening of the screw means 16, the roller 15 is secured to the support section 14 without a possibility to rotate relative thereto. This corresponds to a locking position of the locking device 20.

In order to provide for rotation of the roller 15 about the support section 14, it should be dismounted from the support section 14, after releasing of the screw means 16, be pivoted by 180° about a rotational axis extending now perpendicular to the hub axis, and again be mounted on the support section 14. The end of the hub 18, which is adjacent only to the support section 14, has no counter-elements 22a but only a passing-through annular groove 25 (see FIG. 4), so that the roller 15 becomes rotatably supported on the support section 14 upon tightening of the screw means 16. The locking device 20 occupies in this case its release position.

FIGS. 5a and 5b show an arrangement of the roller 15 and of the support section 14 of the another embodiment of a hand-held power tool according to the present invention. The hand-held power tool, which is shown in FIGS. 5a-5b distinguishes from that shown in FIGS. 1-4 in that the locking element 21b of the locking device 20 is formed as an axially displaceable locking pin that is displaceable in a guide 26 formed in the support section 14. The locking element 21b is securable in the support section 14 with locking means 23 in two positions. In the position shown in FIG. 5a, the locking element 21b is withdrawn from the counter-locking element 22b which is formed as a pin receptacle, and the roller 15 is rotatably supported on the support section 14. The locking device 20 occupies its release position.

On the roller 15, the counter-locking elements 22b or the pin receptacles are formed in the running wheel 17 and are equidistantly distributed (in the circumferential direction) thereon.

In FIG. 5b, the locking element 21b is displaced with a handle 24 by the user in the direction shown with arrow 27, so that the front end of the locking element 21b remote from the handle 24 is pushed into the pin receptacle or the counter-locking element 22b. The locking device 20 occupies its locking position. The locking means 23 now retain the locking element 21b in the locking position, until the locking element 21b is again displaced manually.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A hand-held power tool for driving a cutting or grinding working tool (12), comprising a running gear (13) having a support section (14), and a roller (15) rotatably supported on the support section (14) for displacing the power tool; and a locking device (20) having a locking position in which the roller (15) is secured to the support section (14) against rotation relative thereto, providing for a stable support of the power tool at a localized spot, and a release position in which the roller (15) is rotatable relative to the support section (14) for displacing the power tool, the locking device (20) having at least one locking element (21a, 21b) provided on one end of the support section (14), and at least one counter-locking element (22a, 22b) provided on one end of the roller (15) and engageable with the at least one locking element (21a, 21b) of the support section (14) in a locking position of the locking device (20) for securing the roller (15) on the support section (14) against rotation relative thereto; and an annular groove (25) provided on another end of the roller (15) and engageable with the at least one locking element (21a, 21b) of the support section (14) in the release position of the locking device (20) for enabling rotation of the roller (15) relative to the support section (14).

2. A hand-held power tool according to claim 1, wherein the locking element (21a) is formed as a projection provided on the support section (14), and the counter-locking element (22a) is formed as an opening provided in the roller (15) for formlockingly receiving the projection.

3. A hand-held power tool according to claim 1, wherein the running gear (13) has a further support section (14), for displacing the power tool; and a locking position in which a further roller (15) is secured to the further support section (14) against rotation relative thereto, providing for a stable support of the power tool at a localized spot, and a release position in which the further roller (15) is rotatable relative to the further support section (14) for displacing the power tool, a further locking device (20) having at least one locking element (21a, 21b) provided on one end of the further support section (14), and at least one counter-locking element (22a, 22b) provided on one end of the further roller (15) and engageable with the at least one locking element (21a) in a locking position of the further locking device (20) for securing the roller (15) on the further support section (14) against rotation relative thereto; and a further annular groove (25) provided on another end of the further roller (15) for enabling rotation of the further roller (15) relative to the support.

4. A hand-held power tool according to claim 1, wherein the locking element (21b) is formed as an elongate locking pin displaceable along a longitudinal extent thereof, and the counter-locking element (22b) is formed as a pin receptacle for formlockingly receiving the pin in the locking position of the locking device (20).

* * * * *